(12) United States Patent
Kim et al.

(10) Patent No.: US 7,479,948 B2
(45) Date of Patent: Jan. 20, 2009

(54) TERMINAL AND METHOD FOR ENTERING COMMAND IN THE TERMINAL

(75) Inventors: Tae Hun Kim, Incheon-si (KR); Boem Young Woo, Gyeonggi-do (KR); Jeong Hyuk Yoon, Seoul (KR); Hyun Ju Ahn, Seoul (KR); Seung Sook Han, Gyeonggi-do (KR); Jun Serk Park, Seoul (KR); Ho Sang Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 11/653,873

(22) Filed: Jan. 17, 2007

(65) Prior Publication Data

US 2007/0247441 A1    Oct. 25, 2007

(30) Foreign Application Priority Data

Apr. 25, 2006    (KR) .................... 10-2006-0037178

(51) Int. Cl.
*G06F 3/041*    (2006.01)

(52) U.S. Cl. ..................................................... 345/173

(58) Field of Classification Search ................. 345/156, 345/168, 169, 173; 178/18.01
See application file for complete search history.

(56) References Cited

U.S. PATENT DOCUMENTS

| | | | | | |
|---|---|---|---|---|---|
| 5,483,261 | A | * | 1/1996 | Yasutake | .................... 345/173 |
| 5,825,352 | A | * | 10/1998 | Bisset et al. | ................ 345/173 |
| 5,982,352 | A | * | 11/1999 | Pryor | ......................... 345/156 |
| 2004/0174399 | A1 | * | 9/2004 | Wu et al. | .................... 345/863 |
| 2006/0026521 | A1 | * | 2/2006 | Hotelling et al. | ............ 715/702 |

FOREIGN PATENT DOCUMENTS

| | | |
|---|---|---|
| JP | 10124239 | 5/1998 |
| WO | WO-2005/057391 A1 | 6/2005 |
| WO | WO-2006/020305 A2 | 2/2006 |

* cited by examiner

*Primary Examiner*—Amr Awad
*Assistant Examiner*—Stephen G Sherman
(74) *Attorney, Agent, or Firm*—Birch, Stewart, Kolasch & Birch, LLP (57) ABSTRACT

A terminal including a touch-screen display configured to be touched by a user, and a controller configured to determine a number of simultaneous touches on the touch-screen and to perform a function based on the determined number of simultaneous touches.

4 Claims, 6 Drawing Sheets

TERMINAL AND METHOD FOR ENTERING COMMAND IN THE TERMINAL

This application claims the benefit of Korean Patent Application No. 10-2006-0037178, filed on Apr. 25, 2006, which is hereby incorporated by reference as if fully set forth herein.

BACKGROUND OF THE INVENTION

1. Field of the Invention

The present invention relates to an electronic device including a touch screen in which a function is performed based on a number of simultaneous touches.

2. Discussion of the Related Art

Several electronic devices now include touch screens that allow a user to select a menu option by simply touching the screen at the position of the particular menu option. For example, KIOSK terminals such as an Automated Teller Machine (ATM) include such touch screens. Mobile terminals such as cell phones, Personal Digital Assistants (PDAs), laptop computers, etc. also include such touch screens.

However, in the related art electronic devices, the user is only able to select a predetermined option, but can not easily edit a selected option. For example, a user can withdraw money using an ATM by entering their Personal Identification Number (PIN), selecting the Withdraw menu option, and entering the amount of money to withdraw. Similarly, a user can create a short message (e.g., text message) on a mobile terminal by selecting a Create Text Message menu option and entering the appropriate text.

However, when the user wants to change the amount of money to withdraw or change the text message, the user must use the backspace or delete key. This is often cumbersome and inconvenient, especially when the user wants to delete character(s) in the middle of the data. That is, the user must also delete all of the data in front of the data he or she wants to delete. In addition, to flip through pages in an electronic book, the user must individually select a turn page command provided on a keypad that is separate from the display. One page is turned in the electronic book based on each selection of the turn page command.

SUMMARY OF THE INVENTION

Accordingly, one object of the present invention is to address the above-noted and other problems.

Another object of the present invention is to provide a method and corresponding terminal that allows a user to easily edit information displayed on the touch screen.

Yet another object of the present invention is to provide a method and corresponding terminal that allows a user to flip through pages in an electronic book such as a calendar, scheduler, etc. by touching the touch screen.

To achieve these objects and other advantages and in accordance with the purpose of the invention, as embodied and broadly described herein, the present invention provides in one aspect, a terminal including a touch-screen display configured to be touched by a user, and a controller configured to determine a number of simultaneous touches on the touch-screen and to perform a function based on the determined number of simultaneous touches. The present invention also provides a corresponding touch screen method.

In another aspect, the present invention provides a terminal including a touch-screen display configured to be touched by a user, and a controller configured to determine an area of the touch-screen display that is touched by the user and to perform an operation on data displayed on the touch-screen display based on the determined area of the touch-screen touched by the user. The present invention also provides a corresponding touch screen method.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
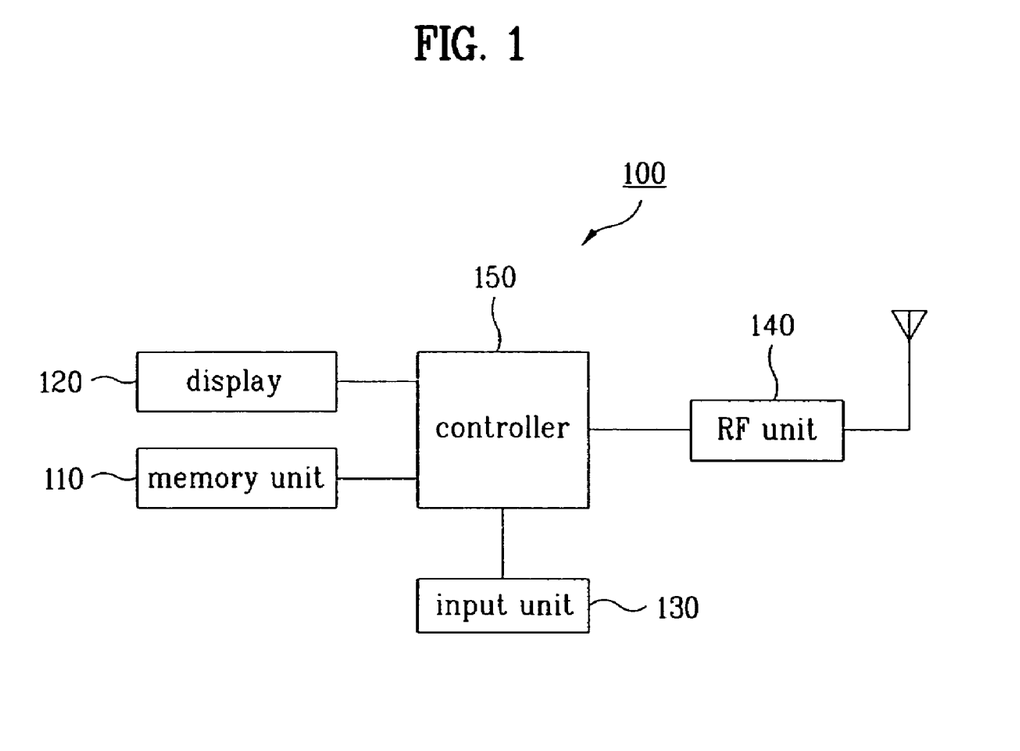
FIG. 1 is a block diagram illustrating a mobile terminal according to an embodiment of the present invention.

Turning first to FIG. 1, which is a block diagram illustrating a mobile terminal 100 according to an embodiment of the present invention. As shown, the mobile terminal 100 includes a memory unit 110, a display 120, an input unit 130, a Radio Frequency (RF) unit 140, and a controller 150. The memory unit 110 includes software programs for driving a plurality of functions provided by the mobile terminal 100, and data associated with the software programs.

Further, the display 120 displays images associated with the above-mentioned functions of the mobile terminal 100, and also other information associated with the operation of the mobile terminal. The display 120 is also a touch-screen display in which the user selects menu options and enters information by touching the screen with a pointing stylus or finger, for example. In addition, the touch-screen display may be configured by at least one of an electrostatic capacitive method, a resistive overlay method, an infrared beam method, a surface acoustic wave method, an integral strain gauge method, a piezo-electric method, etc.

Further, the input unit 130 allows the user to enter a variety of commands or information on the mobile terminal 100. The input unit 130 includes a keypad, touch-wheel, touchpad or voice recognition device, for example, which can be selected by the user to enter information. In addition, the touch-screen display 120 may also include all necessary functions allowing a user to enter information on the terminal 100, which replaces the functions of the input unit 100.

The RF unit 140 processes a variety of RF signals to allow the mobile terminal 100 to communicate with a communication network and thereby perform communication services such as a voice-call service, SMS (Short Message Service), MMS (multimedia message service), etc. The controller 150 controls all operations of the terminal 100 including the memory unit 110, the touch-screen display 120, the input unit 130 and the RF unit 140.

In addition, the controller 150 recognizes a number of simultaneous-touches and/or a touch area of a pointer touching the touch-screen. That is, the controller 150 determines a number of simultaneous touches on the touch-screen and performs a function based on the determined number of simultaneous touches.

In more detail, the number of simultaneous touches corresponds to the user simultaneously touching at least two different positions on the touch-screen display 120 at a same time. For example, the user can touch the touch-screen display 120 with one finger and then touch the touch-screen display 120 with another finger a few second later while still touching the touch-screen display 120 with the first finger. In this instance, the user is touching the touch-screen display 120 simultaneously at two different positions at the same time. Alternatively, the user can touch the touch-screen display 120 with two fingers at the same time. Similar to above, the user is touching the touch-screen display 120 simultaneously at two different positions at the same time.

In addition, the controller 150 also determines an area of the touch-screen display 120 that is touched by the user and performs a function based on the determined area of the touch-screen touched by the user. That is, the controller 150 analyzes a command entered on the touch-screen based on the recognized number of simultaneous-touches and/or the touch area of the pointer.

For example, the controller 150 recognizes when a user touches the touch-screen display 120 with one finger, with two fingers, with three fingers, etc. The controller 150 also recognizes what portion of the touch-screen display 120 the user touches. The controller 150 can also determine that the user has dragged a pointer such as his or her finger along a particular portion of the touch-screen display 120 and in which direction (e.g., left to right, up and down, etc.) the user has dragged the pointer. Thus, the controller 150 can determine or set functions associated with actions performed by the user on the touch-screen display 120.

Figure 2:
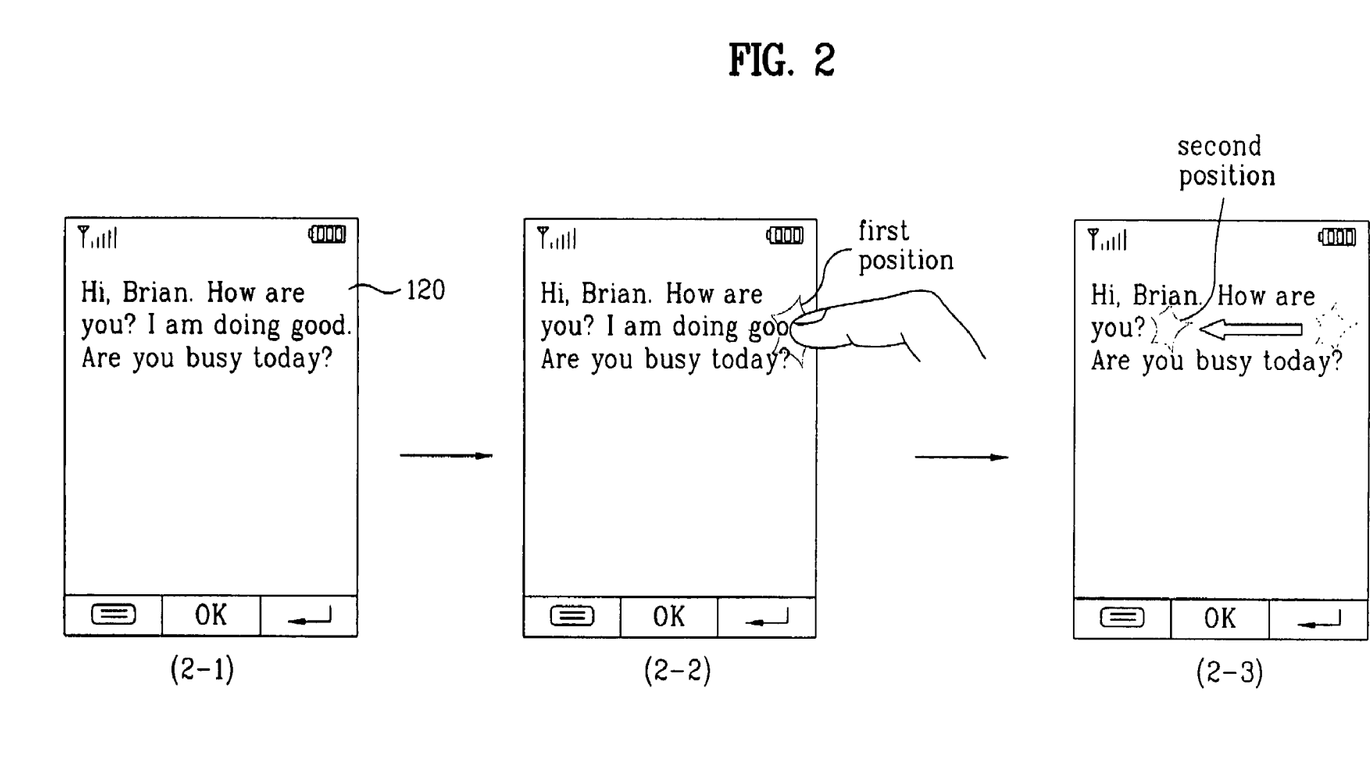
FIG. 2 is an overview illustrating a user deleting a portion of text according to an embodiment of the present invention.

Turning next to FIG. 2, which is an overview illustrating a user deleting a portion of text according to an embodiment of the present invention. As shown in FIG. 2-1, the user has created an SMS message on the touch-screen display 120. The user may create such an SMS message by selecting a "Create SMS message" menu option provided on the touch-screen display 120 or the input unit 130. The user can then select the appropriate characters to create the desired SMS text message.

Previously, if the user wanted to delete a portion of the SMS message, he or she had to press a "Deletion," "Cancel" or "Back Space" key on the input unit several times to delete the desired text. For example, and with reference to FIG. 2-1, if the user wanted to delete the text "I am doing good," the user would have to press the backspace key at least 14 times to delete this sentence. This is very inconvenient for the user.

Similarly, if the user wanted to delete only the word "am" in the sentence "I am doing good," the user would have to delete the words in front of the word "am" in order to delete the word "am." That is, the user would also have to delete the words "doing good" in order to delete the word "am." The user would then have to retype the words "am doing good," even though he or she only wanted to delete the word "am." This is also very inconvenient to the user.

The present invention solves the above problems by advantageously allowing the user to select the portion of text he or she desires to delete by simply touching and dragging a pointer such as his or her finger across the portion of text desired to be deleted. In more detail, and as shown in the embodiment of FIG. 2, the user can touch the touch-screen display 120 at a first position (FIG. 2-2) and then slide or drag his or her finger along the touch-screen display 120 to a second position (FIG. 2-3). The controller 150 recognizes the user has performed this operation and deletes the text on the touch-screen display 120 between the first and second positions (as shown in FIG. 2-3).

In more detail, a table or database may be stored in the memory unit 110 indicating that an operation in which the user touches a first position on the touch-screen display 120, drags his or her finger across the touch-screen display 120 and touches a second position on the touch-screen display 120 corresponds to a delete operation. The controller 150 then uses this stored information in order to appropriately delete the desired text.

Thus, in accordance with an embodiment of the preset invention, the user can easily delete a portion of text without having to enter the backspace or delete key several times. Further, although not specifically shown in FIG. 2, the user can also delete a word or words contained in the middle of the sentence without deleting all the words in the sentence.

Figure 3:
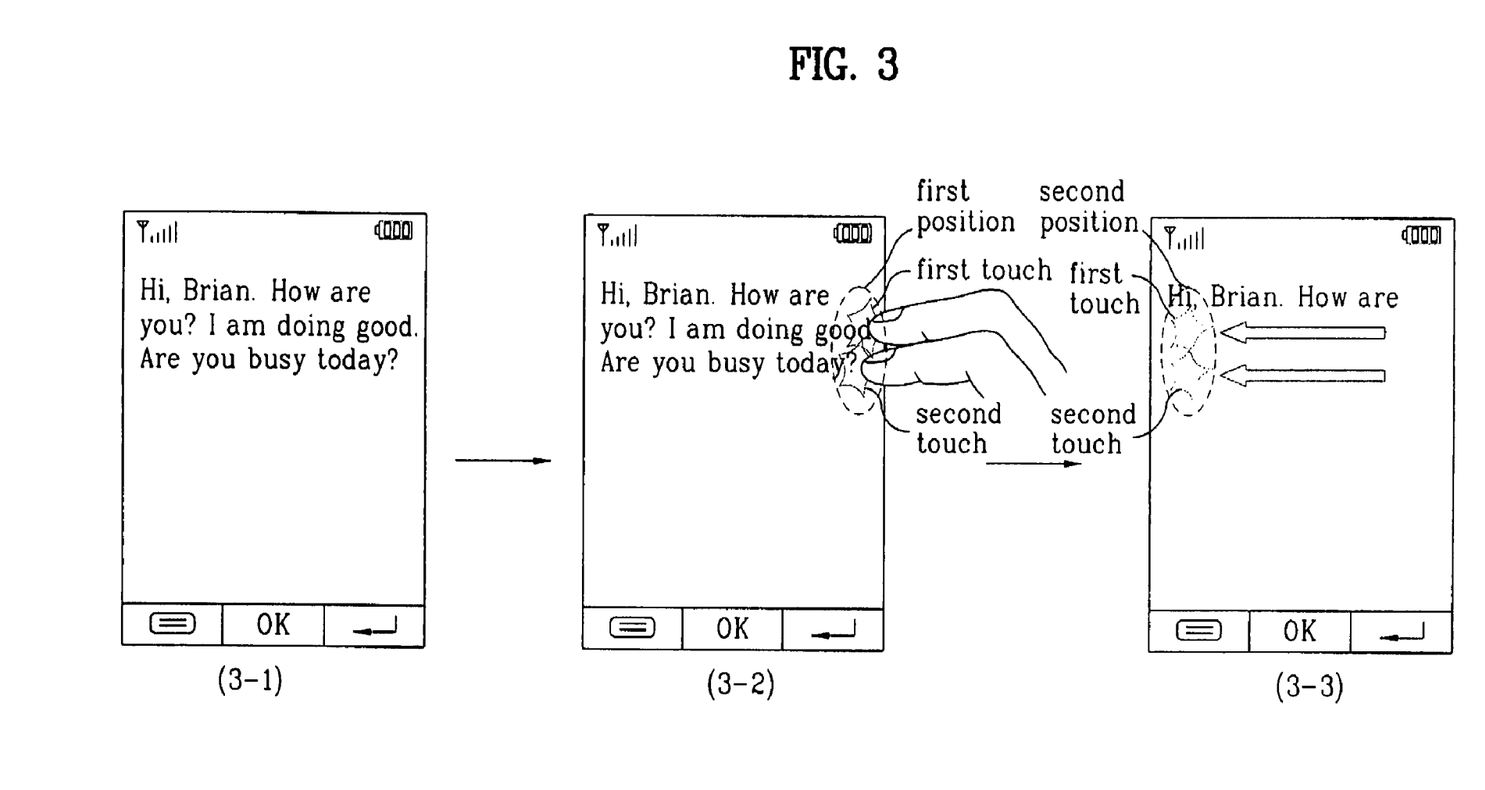
FIG. 3 is an overview illustrating a user deleting a portion of text according to another embodiment of the present invention.

Turning next to FIG. 3, which illustrates another method of deleting text according to another embodiment of the present invention. In this method, the user is able to delete a larger portion of text than in the embodiment of FIG. 2.

In more detail, and as shown in FIG. 3-1, the user first creates a text message as in FIG. 2-1. The user then touches the touch-screen display 120 in two places (e.g., with two fingers) at first and second positions (i.e., the first and second touches shown in FIG. 3-2). The user then drags his or her fingers to a third position to delete the text from the first and second positions to the third position (as shown in FIG. 3-3). Thus, the user is able to delete all of text in between these positions. Similarly to the embodiment in FIG. 2, the controller 150 may refer to a table or database stored in the memory unit 110 to perform such a function.

Figure 4:
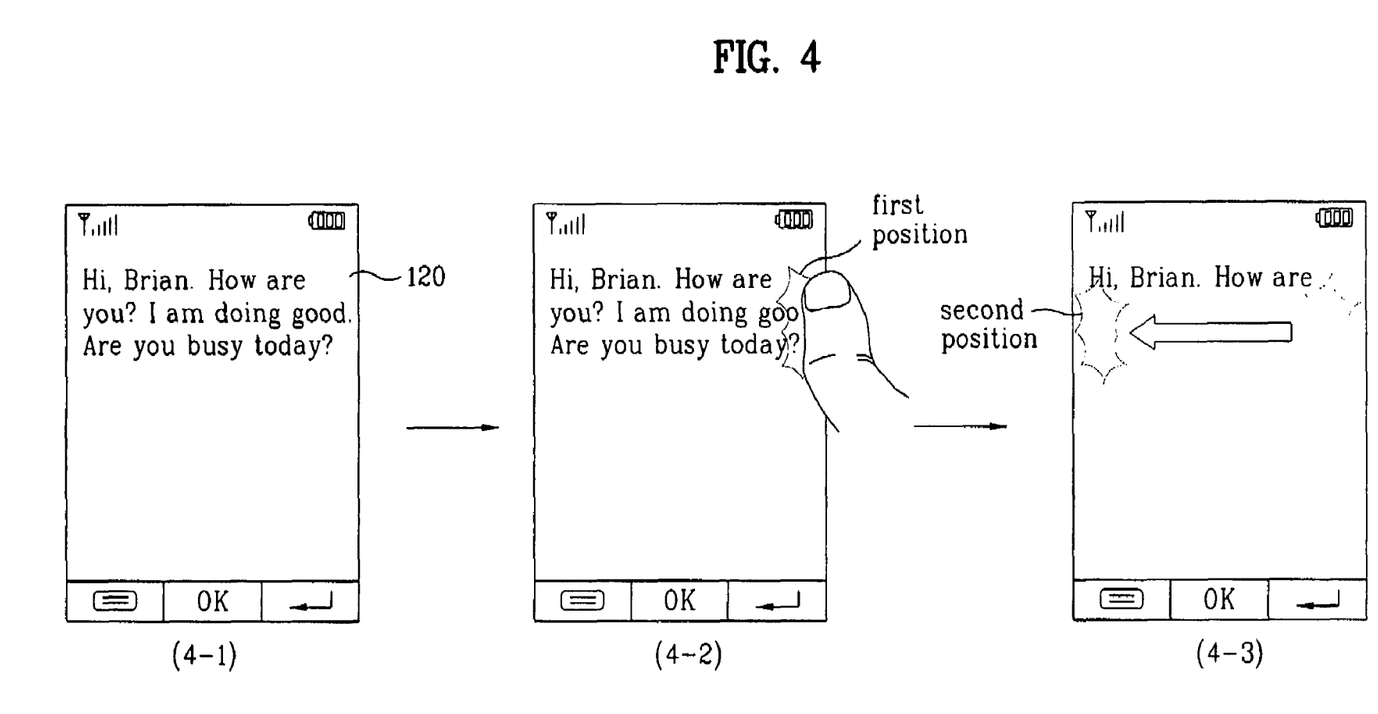
FIG. 4 is an overview illustrating a user deleting a portion of text according to yet another embodiment of the present invention.

FIG. 4 illustrates yet another embodiment of the present invention that allows the user to delete a desired portion of text. In more detail, the user first creates an SMS text message as shown in FIG. 4-1. Then the user presses his or her finger or stylus at a first position over a desired area on the touch-screen display 120 (FIG. 4-2). For example, the user can press his or her forefinger over multiple sentences or lines of text in the text message (as shown in FIG. 4-2).

The user then drags his or her finger or stylus to a second position to delete all text from the first to second positions (FIG. 4-3). Thus, in this embodiment, the user can delete or erase a plurality of characters belonging to the touch area from the first position to the second position. In addition, the user may also simultaneously touch/rub three or more positions on the touch-screen so that a plurality of characters corresponding to the three or more positions are deleted.

Further, although not shown in the figures, the user may delete or erase all characters of an SMS message on the touch-screen display 120 by touching the touch-screen a predetermined number of times in a successive manner (e.g., 4 touches). For example, the table or database of the memory unit 110 may indicate that if the user touches the touch-screen display 4 times in a successive manner (e.g., within a predetermined amount of time), all text on the touch-screen display 120 is to be deleted.

Figure 5:
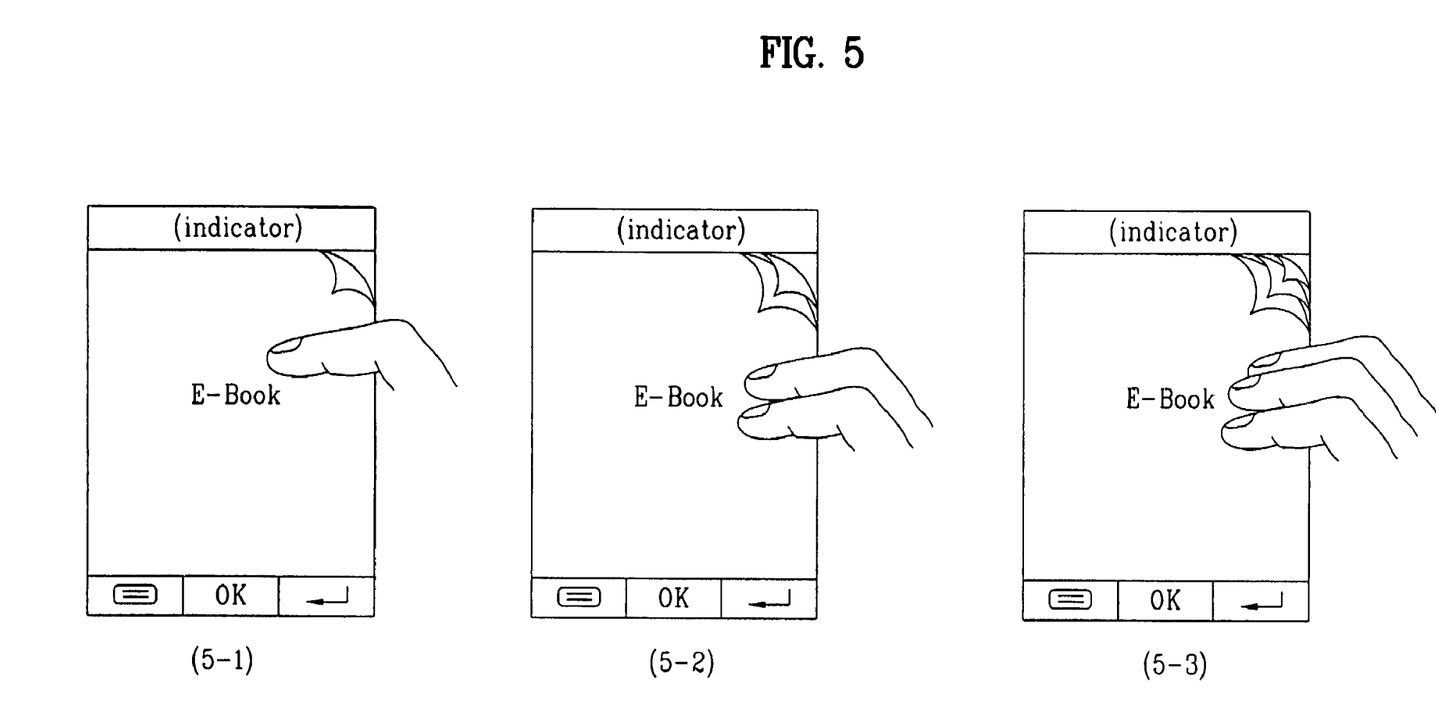
FIG. 5 is an overview illustrating a user performing a paging operation according to an embodiment of the present invention.

Turning now to another embodiment of the present invention as shown in FIG. 5 in which the user may flip through pages (i.e., perform a paging operation) in an electronic book (e.g., calendar, scheduler, etc.) displayed on a terminal.

In this embodiment, and as shown in FIG. 5, the user is able to flip one page by touching the touch-screen display 120 with one finger (FIG. 5-1), flip two pages by touching the touch-screen display 120 with two fingers (FIG. 5-2), flip three pages by touching the touch-screen display 120 with three fingers (FIG. 5-3), etc. That is, the table or database stored in the memory unit 110 may indicate that when the user in viewing an electronic book such as a calendar or scheduler, the user may page through a desired number of pages based on the number of positions the user simultaneously touches the touch-screen display 120.

This embodiment is particular advantageous because in the past, if a user wanted to turn a page of the displayed electronic book, the user could only turn only one page of the electronic book by selecting a turn page command. Further, although not shown in FIG. 5, the user may turn to the last page of the electronic of the electronic book by pressing a holding the touch-screen display 120 for a predetermined amount of time. Similarly, the user may return to the first page of the electronic book by again touching and holding the touch-screen display 120 for the predetermined amount of time.

Figure 6:
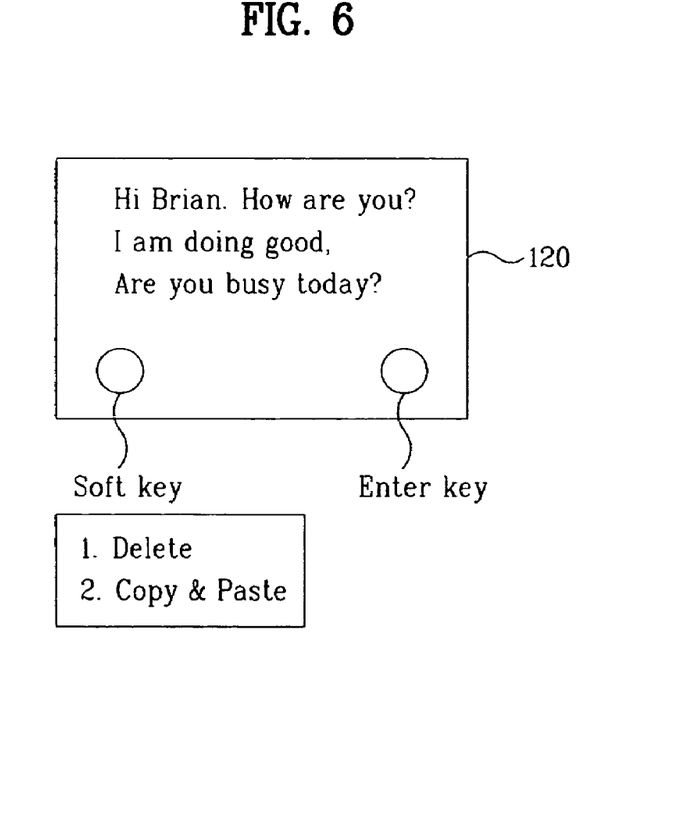
FIG. 6. is an overview illustrating a user selecting between a cut and past operation according to an embodiment of the present invention.

Turning next to FIG. 6, which is an overview illustrating an embodiment of the present invention in which the user can selectively determine whether the touching of the touch-screen display 120 deletes the text or cuts and pastes the text. In more detail, the description with respect to FIGS. 2-4 corresponds to the user deleting the data displayed on the touch-screen display 120.

However, in an alternative embodiment and as shown in FIG. 6, the user can press a soft key on the touch-screen display 120 to toggle between a delete mode and a cut and paste mode. For example, when the user touches the soft key, a menu is provided allowing the user to select (1) a delete mode or (2) a cut and paste mode. If the user selects (1) the delete mode, the data will be deleted as described with respect to FIGS. 2-4. However, if the user selects (2) the cut and paste mode, the data that was deleted in FIGS. 2-4 will instead be cut (and not deleted). The user can then paste the cut data at any location on the touch-screen display 120 by again touching the touch-screen display 120.

For example, if the user selected the cut and paste mode (rather than the delete mode), the user could cut the phrase "I am doing good." in FIG. 2-3, and paste this cut data below the phrase "Are you busy today?" by simply touching the screen below this phrase. Thus, in accordance with the embodiment shown in FIG. 6, the user can selectively choose between a delete mode and a cut and paste mode. In addition, rather than displaying a menu as in FIG. 6, the soft key may be labeled with its current mode. That is, in the cut and paste mode, the soft key is labeled "cut and paste," and in the delete mode, the soft key is labeled "delete". Thus, the user can toggle between the two modes by touching the soft key.

Figure 7:
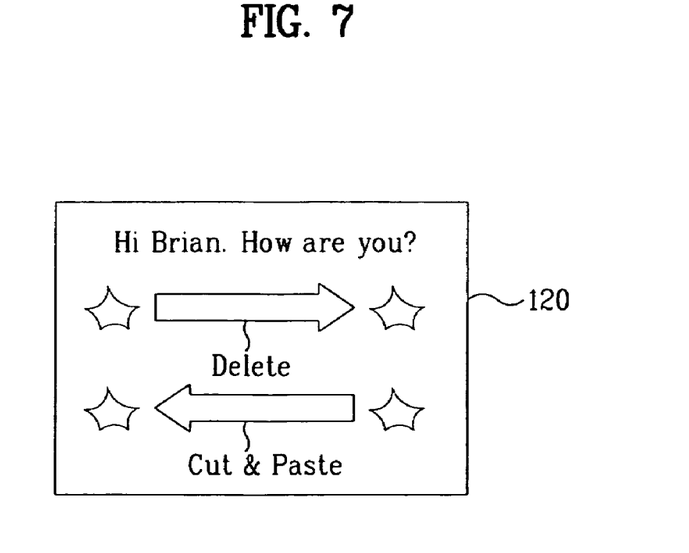
FIG. 7. is an overview illustrating a user selecting between a cut and past operation according to another embodiment of the present invention.

In yet another alternative embodiment as shown in FIG. 7, the user can advantageously delete data or cut and paste data based on the direction in which he or she drags the pointer (e.g., in a left or right direction). For example, and as shown in FIG. 7, the user can delete data by dragging the pointer in a left to right direction, and cut and paste data by dragging the pointer in a right to left direction. An up or down direction, etc. may also be used. If the user wants to paste the cut data, the user can again touch a location on the touch-screen display 120 to indicate where the data is to be pasted (as discussed above).

Thus, in accordance with different embodiments of the present invention, the user can perform a variety of different editing, paging, etc. commands by simply touching the touch-screen display unit. Further, the above-description related to a mobile terminal such as a cell phone. However, the present invention also relates to other terminals or electronic devices such as a PDA (Personal Digital Assistants), a game machine, a KIOSK terminal (e.g., an ATM), etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A terminal, comprising:
   a touch-screen configured to receive a command from a user who touches the touch-screen; and
   a controller configured to analyze the command in consideration of a number of simultaneous touches on the touch-screen,
   wherein the command is a deletion command configured to delete at least one character displayed on the touch-screen by rubbing the character with a pointer, and the controller is configured to determine an area to be deleted in consideration of the number of the simultaneous touches, and
   wherein the pointer is the user's finger and the number of simultaneously touches includes the user touching the touch-screen with at least two fingers and then the controller automatically deletes at least one character on a first line based on one of the user's fingers and deletes at least one character on a second line based on another one of the user's finger.

2. A method for entering a command in a terminal equipped with a touch-screen, comprising:
   receiving a command from a user who touches the touch-screen; and
   analyzing the command in consideration of a number of simultaneous touches on the touch-screen,
   wherein the command is a deletion command configured to delete at least one character displayed on the touch-screen by rubbing the character with a pointer, and the step of analyzing includes determining an area to be deleted in consideration of the number of the simultaneous touches, and
   wherein the pointer is the user's finger and the number of simultaneously touches includes the user touching the touch-screen with at least two fingers and the method further comprises automatically deleting at least one character on a first line based on one of the user's fingers and deletes at least one character on a second line based on another one of the user's finger.

3. A terminal, comprising:
   a touch-screen configured to receive a command from a user who touches the touch-screen; and
   a controller configured to analyze the command in consideration of a touched area on the touch-screen, wherein the command is a deletion command configured to delete at least one character displayed on the touch-screen by rubbing the character with a pointer, and the controller is configured to determine an area to be deleted in consideration of the touched area of the pointer, and wherein the pointer is the user's finger and the number of simultaneously touches includes the user touching the touch-screen with at least two fingers and then the controller automatically deletes at least one character on a first line based on one of the user's fingers and deletes at least one character on a second line based on another one of the user's finger.

4. A method for entering a command in a terminal equipped with a touch-screen, comprising:

receiving a command from a user who touches the touch-screen; and analyzing the command in consideration of a touched area on the touch-screen, wherein the command is a deletion command configured to delete at least one character displayed on the touch-screen by rubbing the character with a pointer, and the step of analyzing includes determining an area to be deleted in consideration of the touched area of the pointer, and wherein the pointer is the user's finger and the number of simultaneously touches includes the user touching the touch-screen with at least two fingers and the method further comprises automatically deleting at least one character on a first line based on one of the user's fingers and deletes at least one character on a second line based on another one of the user's finger.

* * * * *